(12) United States Patent
Kalyanaraman

(10) Patent No.: US 12,371,538 B2
(45) Date of Patent: Jul. 29, 2025

(54) METHOD OF PREPARING POLYMER PARTICLES AND POLYMER PARTICLES PREPARED THEREBY

(71) Applicant: SHPP GLOBAL TECHNOLOGIES B.V., Bergen op Zoom (NL)

(72) Inventor: Viswanathan Kalyanaraman, Mt Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 593 days.

(21) Appl. No.: 17/626,910

(22) PCT Filed: Sep. 14, 2020

(86) PCT No.: PCT/US2020/050635
§ 371 (c)(1),
(2) Date: Jan. 13, 2022

(87) PCT Pub. No.: WO2021/055267
PCT Pub. Date: Mar. 25, 2021

(65) Prior Publication Data
US 2022/0251309 A1 Aug. 11, 2022

(30) Foreign Application Priority Data
Sep. 16, 2019 (EP) ..................... 19197564

(51) Int. Cl.
*C08J 3/14* (2006.01)
(52) U.S. Cl.
CPC ............. *C08J 3/14* (2013.01); *C08J 2300/12* (2013.01); *C08J 2367/03* (2013.01); *C08J 2369/00* (2013.01); *C08J 2371/00* (2013.01); *C08J 2371/10* (2013.01); *C08J 2371/12* (2013.01); *C08J 2381/04* (2013.01); *C08J 2381/06* (2013.01)

(58) Field of Classification Search
CPC ...... C08J 3/14; C08J 2369/00; C08J 2371/10; C08J 2381/06; C08J 2300/12; C08J 2367/03; C08J 2371/00; C08J 2371/12; C08J 2381/04
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 4,012,461 A | 3/1977 | Van Brederode |
| 4,176,222 A | 11/1979 | Cinderey et al. |
| 4,970,272 A | 11/1990 | Gallucci |
| 4,975,525 A | 12/1990 | Hostetler et al. |
| 5,043,112 A | 8/1991 | Beck |
| 6,887,930 B2 | 5/2005 | Uchida et al. |
| 2004/0054121 A1* | 3/2004 | Peemans ................ C08G 65/46 528/214 |
| 2005/0113558 A1 | 5/2005 | Johnson et al. |
| 2006/0069236 A1 | 3/2006 | Brunelle et al. |
| 2006/0167216 A1 | 7/2006 | Johnson et al. |
| 2014/0100312 A1* | 4/2014 | Peters ................ C08G 18/4854 524/416 |

FOREIGN PATENT DOCUMENTS

| | | | |
|---|---|---|---|
| DE | 102011103468 A1 * | 12/2012 | ............ B65D 85/84 |
| EP | 0376653 A2 | 7/1990 | |
| EP | 0411217 A1 | 2/1991 | |
| EP | 2686368 | 9/2012 | |
| EP | 3341184 | 3/2017 | |
| GB | 962941 | 7/1964 | |
| JP | 2009173878 A | 8/2009 | |
| WO | 2018080911 A1 | 5/2018 | |
| WO | 2019040314 A1 | 2/2019 | |

OTHER PUBLICATIONS

International Search Report mailed Dec. 23, 2020; International Application No. PCT/US2020/050635; International Filing Date Sep. 14, 2020 (6 pgs).
Kim, K-J, "Nano/micro spherical poly(Methyl methacrylate) particle formation by cooling from polymer solution" Powder Technology, Elsevier, Basel (CH), vol. 154, No. 2-3 (2005) (156-163).
Written Opinion mailed Dec. 23, 2020; International Application No. PCT/US2020/050635; International Filing Date Sep. 14, 2020 (10 pgs).

* cited by examiner

*Primary Examiner* — Rabon A Sergent
(74) *Attorney, Agent, or Firm* — CANTOR COLBURN LLP

(57) ABSTRACT

Fine polymer particles are prepared by dissolving a polycarbonate, a poly(arylene ether), or a poly(arylene ether sulfone), each in a specific solvent, to form a slurry, heating the slurry to a temperature greater than the solvent boiling point to form a homogeneous solution, cooling the solution to form a dispersion of fine particles, and isolating the fine particles. A volume-based distribution of the isolated fine particles has a median equivalent spherical diameter less than or equal to 125 micrometers.

9 Claims, 1 Drawing Sheet

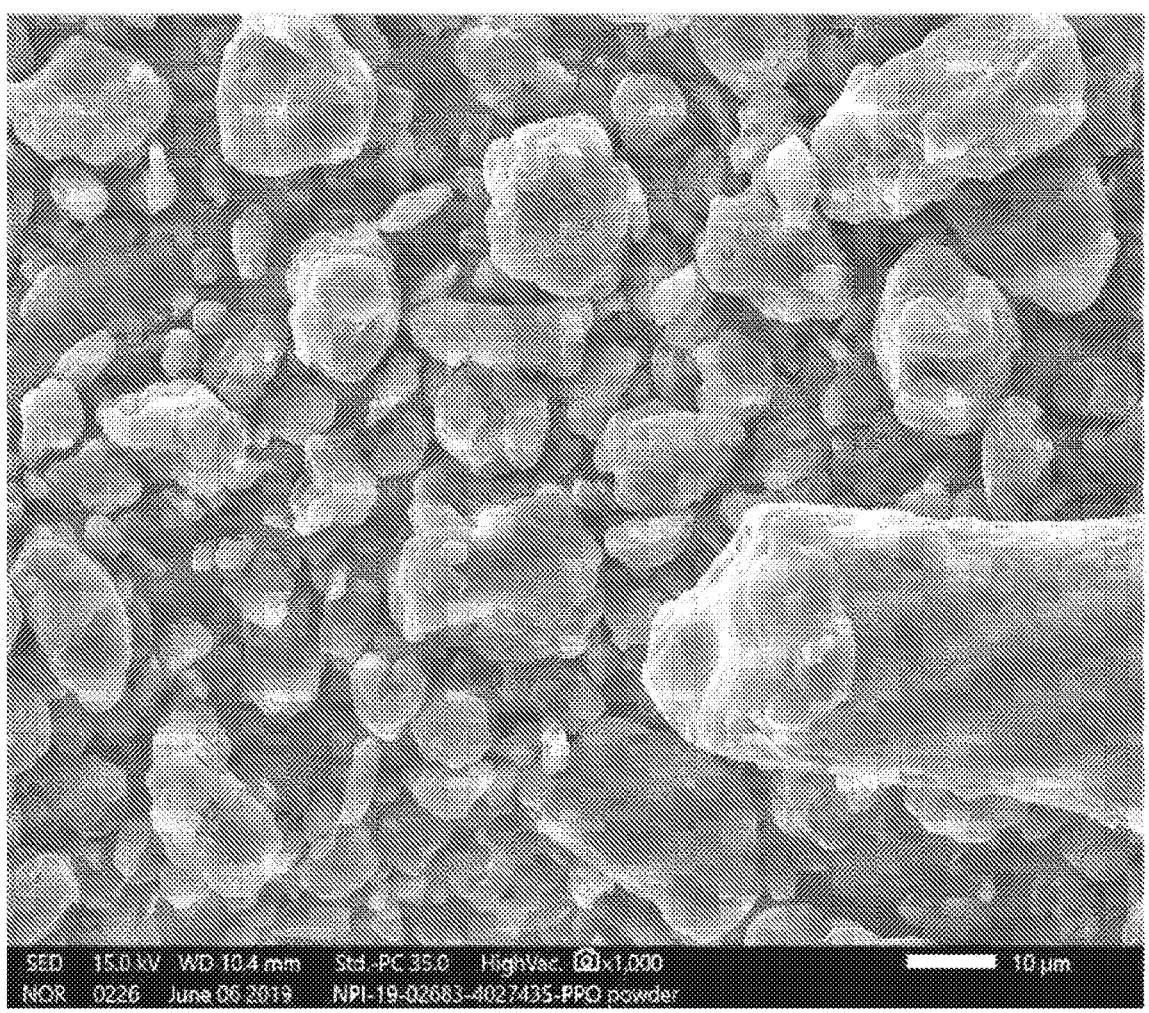

METHOD OF PREPARING POLYMER PARTICLES AND POLYMER PARTICLES PREPARED THEREBY

CROSS-REFERENCE TO RELATED APPLICATIONS

This application is a National Stage application of PCT/US2020/050635, filed Sep. 14, 2020, which claims the benefit of European Application No. 19197564.8, filed Sep. 16, 2019, both of which are incorporated by reference herein in their entirety.

BACKGROUND

High performance polymers can be made into powders, for example ultra-fine powders having a diameter of less than or equal to 125 micrometers. Such powders can be made by emulsion processes, for example by emulsifying the polymer in an organic solvent and removing the organic solvent from the emulsion through distillation.

However, particles made by such methods can result in poor yields. Furthermore, some polymers are not amenable to such processes, in particular, polymers having reduced solubility in organic solvents. Accordingly, there remains a need for a facile method for preparing polymer particles, in particular for use with polymers where processability limitations preclude the use of known methods (e.g., emulsion processes) and where high yields are desired.

BRIEF DESCRIPTION

One embodiment is a method of preparing polymer particles that includes combining a polymer and a solvent at a first temperature to provide a slurry, wherein the polymer is not soluble in the solvent at the first temperature, and wherein (a) the polymer is a polycarbonate and the solvent is selected from the group consisting of xylene, toluene, ethyl acetate, para-cymene, mesitylene, cyclohexane, ethylbenzene, ethyl lactate, 2-ethoxyethanol, 2-butoxyethanol, and combinations thereof, or (b) the polymer is a poly(arylene ether) and the solvent is selected from the group consisting of acetone, methyl ethyl ketone, methyl n-butyl ketone, methyl iso-butyl ketone, di(iso-butyl) ketone, diacetone alcohol, cyclopentanone, cyclohexanone, anisole, and combinations thereof, or (c) the polymer is a poly(arylene ether sulfone) and the solvent is selected from the group consisting of chlorobenzene, ortho-dichlorobenzene, xylenes, toluene, para-cymene, mesitylene, cyclohexane, ethyl benzene, ethyl lactate, 2-ethoxyethanol, 2-butoxyethanol, cyclohexanone, cyclopentanone, anisole, and combinations thereof; heating the slurry to a second temperature and at a pressure effective to dissolve the polymer in the solvent to provide a homogeneous solution, wherein the pressure is 7 to 2068 kilopascals; cooling the homogeneous solution to a third temperature to provide a dispersion comprising a plurality of polymer particles; and isolating the polymer particles from the dispersion; wherein the isolated polymer particles have a Dv50 particle size of less than or equal to 125 micrometers, determined by laser diffraction according to ISO 13320:2020.

Another embodiment is polymer particles prepared by the method.

The above described and other features are exemplified by the following FIGURES and Detailed Description.

BRIEF DESCRIPTION OF THE DRAWINGS

The FIGURE is a scanning electron microscope (SEM) micrograph of polyphenylene ether powder particles prepared via the method.

DETAILED DESCRIPTION

Disclosed herein is a method of preparing polymer particles. The present inventors have unexpectedly discovered that polymer particles, for example, semi-crystalline polymer particles, can be prepared by heating the polymer, for example, amorphous or semi-crystalline polymer, in a solvent to a temperature and pressure effective to dissolve the polymer, and subsequently cooling the solution to yield the desired polymer particles. Advantageously, the morphology and size distribution of the resulting polymer particles can be controlled through the solids content of the solution, the cooling rate used, and the optional addition of a surfactant.

Additionally, in some embodiments the method disclosed herein uses only one solvent, which can be reused without distillation. In contrast, methods of preparing polymer particles from polymers, for example, polyphenylene ether, that include dissolving the polymer in a solvent such as toluene and precipitation using anti-solvent such as methanol with optional agitation or high shear mixing can be expensive due to distilling a large amount of solvent/anti-solvent mixture to recover individual solvents.

Accordingly, an aspect of this disclosure is a method of preparing polymer particles. The method comprises combining a polymer and a solvent at a first temperature to provide a slurry. The polymer and the solvent can be combined such that the resulting slurry preferably has a solids content (i.e., weight percent of polymer, based on the total weight of polymer, solvent, optional surfactants, and optional additives) of 1 to 50 weight percent, 2 to 40 weight percent, 5 to 30 weight percent, 6 to 20 weight percent, or 7 to 10 weight percent. The polymer is generally not soluble in the solvent at the first temperature. In some embodiments, the first temperature can be less than or equal to 100° C., preferably 10 to 100° C., more preferably 15 to 50° C.

Semi-crystalline polymer powders can be formed from amorphous polymers, such as polycarbonates (including polycarbonate copolymers), poly(arylene ether)s, poly(arylene ether sulfone)s (including polysulfone (PSU), polyethersulfone (PBS), and polyphenylsulfone (PPSU)), polyamideimides, and polyarylates (including poly(4-hydroxybenzoate) and poly(bisphenol A terephthalate). Semi-crystalline polymer powders can also be formed from semi-crystalline polymers, such as polyphenylene sulfides, polyether ether ketones, and poly(butylene terephthalate)s.

The polymer can comprise a polyamideimide, a polyamide, a polyarylate, a polycarbonate, a polyarylene ether, a polyarylene sulfide, or a polyarylene ether ketone, for example, a bisphenol A homopolycarbonate, a bisphenol A copolymer, a polyphenylene ether, a polyphenylene sulfide, or a polyphenylene ether ketone. In an embodiment, only one polymer of a given class is present.

"Polycarbonate" as used herein means a homopolymer or copolymer having repeating structural carbonate units of formula (1)

(1)

wherein at least 60 percent of the total number of $R^1$ groups are aromatic, or each $R^1$ contains at least one $C_{6-30}$ aromatic group. Preferably, each $R^1$ can be derived from a dihydroxy compound such as an aromatic dihydroxy compound of formula (2) or a bisphenol of formula (3).

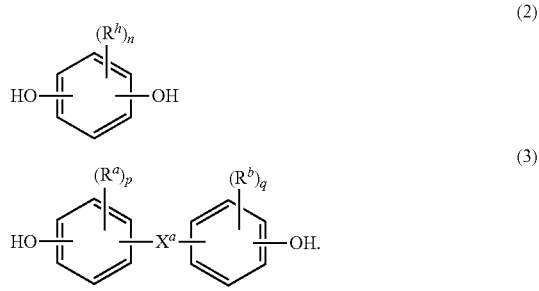

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an aspect, p and q is each 0, or p and q is each 1, and $R^a$ and $R^b$ are each a $C_{1-3}$ alkyl group, preferably methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

In a specific aspect, the polycarbonate is a linear homopolymer containing bisphenol A carbonate units (BPA-PC), commercially available under the trade name LEXAN™ from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN™ CFR from SABIC. A combination of a linear polycarbonate and a branched polycarbonate can be used. It is also possible to use a polycarbonate copolymer or interpolymer rather than a homopolymer. Polycarbonate copolymers can include copolycarbonates comprising two or more different types of carbonate units, for example units derived from BPA and PPPBP (commercially available under the trade names LEXAN™ XHT and LEXAN™ CXT from SABIC); BPA and DMBPC (commercially available under the trade name LEXAN™ DMX from SABIC); or BPA and isophorone bisphenol (commercially available under the trade name APEC™ from Bayer). The polycarbonate copolymers can further comprise non-carbonate repeating units, for example repeating ester units (polyester-carbonates), such as those comprising resorcinol isophthalate and terephthalate units and bisphenol A carbonate units, such as those commercially available under the trade name LEXAN™ SLX from SABIC; bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units; or bisphenol A carbonate units and $C_{6-12}$ dicarboxy ester units such as sebacic ester units (commercially available under the trade name LEXAN™ HFD from SABIC) Other polycarbonate copolymers can comprise repeating siloxane units (polycarbonate-siloxanes), for example those comprising bisphenol A carbonate units and siloxane units (e.g., blocks containing 5 to 200 dimethylsiloxane units), such as those commercially available under the trade name LEXAN™ EXL from SABIC; or both ester units and siloxane units (polycarbonate-ester-siloxanes), for example those comprising bisphenol A carbonate units, isophthalate-terephthalate-bisphenol A ester units, and siloxane units (e.g., blocks containing 5 to 200 dimethylsiloxane units), such as those commercially available under the trade name LEXAN™ PST from SABIC. Combinations of any of the above materials can be used.

"Polycarbonate" as used herein also includes copolymers comprising carbonate units and ester units ("poly(ester-carbonate)s," also known as polyester-polycarbonates). Poly(ester-carbonate)s further contain, in addition to recurring carbonate chain units of formula (1), repeating ester units of formula (4)

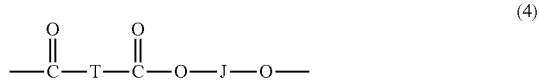

wherein J is a divalent group derived from a dihydroxy compound (which includes a reactive derivative thereof), and can be, for example, a $C_{1-10}$ alkylene, a $C_{6-20}$ cycloalkylene, a $C_{5-20}$ arylene, or a polyoxyalkylene group in which the alkylene groups contain 2 to 6 carbon atoms, preferably, 2, 3, or 4 carbon atoms; and T is a divalent group derived from a dicarboxylic acid (which includes a reactive-derivative thereof), and can be, for example, a $C_{1-20}$ alkylene, a $C_{5-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,4-cyclohexane diol, 1,4-hydroxymethylcyclohexane, or a combination thereof dihydroxy compounds. Aliphatic dicarboxylic acids that can be used include $C_{5-20}$ aliphatic dicarboxylic acids (which includes the terminal carboxyl groups), preferably linear $C_{8-12}$ aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,4-cyclohexane dicarboxylic acid, or a combination thereof acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example from 1:99 to 99:1, or from 10:90 to 90:10, or from 20:80 to 80:20, or from 1:99 to 50:50, or from 50:50 to 99:1.

The term "poly(arylene ether)" or (polyarylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula (5):

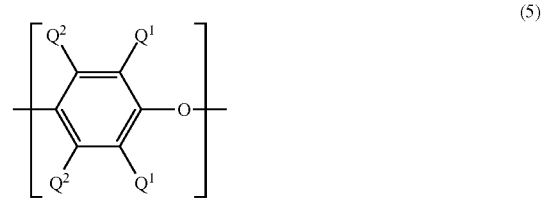

wherein for each structural unit, each $Q^1$ is independently halogen, primary or secondary $C_{1-8}$ alkyl, phenyl, $C_{1-8}$ haloalkyl, $C_{1-8}$ aminoalkyl, $C_{1-8}$ hydrocarbonoxy, or $C_{2-8}$ halohydrocarbonoxy wherein at least two carbon atoms separate the halogen and oxygen atoms; and each $Q^2$ is independently hydrogen, halogen, primary or secondary $C_{1-8}$ alkyl, phenyl, $C_{1-8}$ haloalkyl, $C_{1-8}$ aminoalkyl, $C_{1-8}$ hydrocarbonoxy, or $C_{2-8}$ halohydrocarbonoxy wherein at least two carbon atoms separate the halogen and oxygen atoms. Preferably, each $Q^1$ is alkyl or phenyl, more preferably $C_{1-4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly (arylene ether)s of the present invention further include combinations of any of the above.

The poly(arylene ether) generally has a number average molecular weight of about 3,000 to about 40,000 grams/mole and a weight average molecular weight of about 20,000 to about 80,000 grams/mole, as determined by gel permeation chromatography. The poly(arylene ether) generally can have an intrinsic viscosity of about 0.2 to about 0.6 deciliters per gram (dL/g) as measured in chloroform at 25° C. Within this range, the intrinsic viscosity can preferably be up to about 0.5 dL/g, more preferably up to about 0.47 dL/g. Also within this range, the intrinsic viscosity can preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese, or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups can be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, can contain at least one of the aminoalkyl-containing and 4-hydroxybiphenyl end groups.

The term "polyarylene sulfide" includes polyphenylene sulfide (PPS), polyarylene sulfide ionomers, polyarylene sulfide copolymers, polyarylene sulfide graft copolymers, block copolymers of polyarylene sulfides with alkenyl aromatic compounds or with vinyl aromatic compounds, and combinations comprising at least one of the foregoing polyarylene sulfides. Partially crosslinked polyarylene sulfides, as well as mixtures of branched and linear polyarylene sulfides, can be used in the corona resistant compositions.

Polyarylene sulfides ae known polymers comprising a plurality of structural units of the formula (6):

—R—S—  (6)

wherein R is an aromatic radical such as phenylene, biphenylene, naphthylene, oxydiphenyl, diphenyl sulfone, or is a lower alkyl radical, or a lower alkoxy radical, or halogen substituted derivatives thereof. The lower alkyl and alkoxy substituents typically have about one to about six carbon atoms, for example methyl, ethyl, propyl, isobutyl, n-hexyl, and the like. Preferably, the polyarylene sulfide is a polyphenylene sulfide having repeating structural units of formula (7):

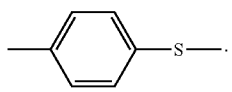  (7)

The polyarylene sulfide preferably has a melt index ranging from about 10 grams to about 10,000 grams per 10 minutes when measured by ASTM D-1238-74 (315.6° C.; load, 5 kg). In another embodiment, the polyarylene sulfide will have an inherent viscosity within the range of about 0.05 to about 0.4, and more preferably about 0.1 to about 0.35, as determined at 206° C. in 1-chloronaphthalene at a polymer concentration of 0.4-g/100 mL solution.

Suitable polyarylene sulfides can be prepared according to U.S. Pat. No. 3,354,129, by reacting at least one polyhalo-substituted cyclic compound containing unsaturation between adjacent ring atoms such as 1,2-dichlorobenzene, 1,3-dichlorobenzene, 2,5-dibromobenzene and 2,5-dichlorotoluene with an alkali metal sulfide in a polar organic compound at an elevated temperature. The alkali metal sulfides are generally monosulfides of sodium, potassium, lithium, rubidium, or cesium. Generally the polar organic compound will substantially dissolve both the alkali metal sulfide and the polyhalo-substituted aromatic compound or any other reaction by-products. The polymers can also be manufactured by the method described in British Pat. No. 962,941 wherein metal salts of halothiophenols are heated to a polymerization temperature.

Polyaryl ether ketones (PAEKs) comprise several polymer types containing aromatic rings, usually phenyl rings, linked primarily by ketone and ether groups in different sequences. Examples of PAEKs include, but are not limited to, polyether ketones (PEK), polyether ether ketones (PEEK), polyether ketone ether ketone ketones (PEKEKK) and polyether ketone ketones (PEKK) and copolymers containing such groups as well as blends thereof. The PAEKs can comprise monomer units containing an aromatic ring, usually a phenyl ring, a ketone group, and an ether group in any sequence. Low levels, for example less than 10 mole %, of addition linking groups can be present as long as they do not fundamentally alter the properties of the PAEK resin. PEEK is commercially available from VICTREX Ltd. as VICTREX™ PEEK. PEKEKK resin is commercially available from BASF Co. as ULTRAPEK™ resins. Polyether ether ketone resins are also available under the GATONE™ and KETASPIRE™ trade names from Solvay Co. and Solvay Advanced Polymers.

For example, several polyaryl ether ketones which are highly crystalline, with melting points above 300° C., can be used. Examples of these crystalline polyaryl ether ketones are shown in the structures (8), (9), (10), (11), and (12) below.

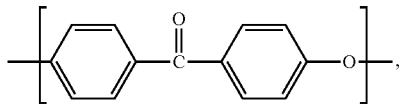 (8)

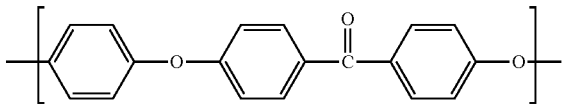 (9)

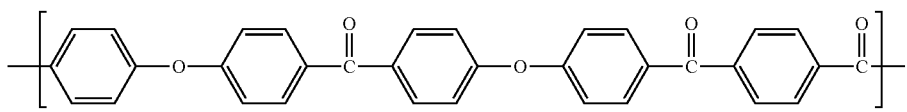 (10)

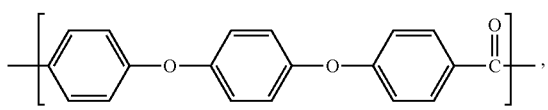 (11)

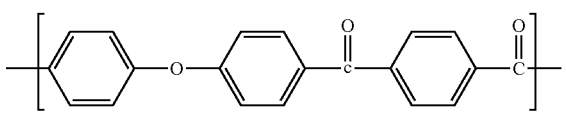 (12)

The formation and properties of polyaryl ether ketones is well known in the art. For example, the electrophilic aromatic substitution (e.g., Friedel-Crafts catalyzed) reaction of aromatic diacyl halides with unsubstituted aromatic compounds such as diphenyl ether some of the early work is disclosed in, for example, U.S. Pat. No. 3,065,205.

Other examples of crystalline polyaryl ether ketones which are suitable for use herein can be generically characterized as containing repeating units of the following formula (13):

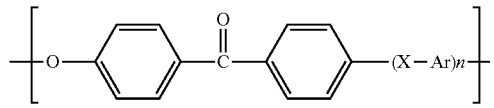
(13)

wherein Ar is independently a divalent aromatic radical selected from phenylene, biphenylene or naphthylene, X is independently —O—, —C(O)—, —O—Ar—C(O)—, —S—, —SO$_2$— or a direct bond, and n is an integer of from 0 to about 10. PAEK resins can be prepared by methods well known in the art. The polyaryl ether ketones can have a reduced viscosity of about 0.4 to about 5.0 dl/g, as measured in concentrated sulfuric acid at 25° C. PAEK resin weight average molecular weight (Mw) can vary from 5,000 to 150,000 grams per mole (g/mol), specifically from about 10,000 to 80,000 g/mole.

A "poly(arylene ether sulfone)" as used herein refers to polymers having repeat units of formula (14)

—Ar$^1$—SO$_2$—Ar$^2$—O— (14)

wherein each Ar$^1$ and Ar$^2$ is the same or different, and is a group of formula (15)

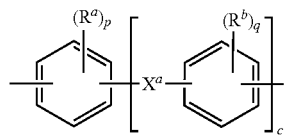
(15)

wherein c is 0 or 1, R$^a$ and R$^b$ are each independently a linear or branched C$_{1-10}$ alkyl, linear or branched C$_{2-10}$ alkenyl, linear or branched C$_{2-10}$ alkynyl, C$_{6-18}$ aryl, C$_{7-20}$ alkylaryl, C$_{7-20}$ arylalkyl, C$_{5-10}$ cycloalkyl, C$_{5-20}$ cycloalkenyl, linear or branched C1-10 alkylcarbonyl, C$_{6-18}$ arylcarbonyl, halogen, nitro, cyano, a halogen, C$_{1-12}$ alkoxy, or C$_{1-12}$ alkyl, and p and q are each independently integers of 0 to 4. It will be understood that when p or q is less than 4, the valence of each carbon of the ring is filled by hydrogen. Also in formula (2), X$^a$ is a bridging group connecting the two hydroxy-substituted aromatic groups, where the bridging group and the hydroxy substituent of each C$_6$ arylene group are disposed ortho, meta, or para (specifically para) to each other on the C$_6$ arylene group. In an embodiment, the bridging group X$^a$ is single bond, —O—, —S—, —S(O)—, —S(O)$_2$—, —C(O)—, or a C-s organic group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. In an embodiment, c is 0 or 1, p and q is each 0, and X$^a$ is isopropylidene.

Specific poly(arylene ether sulfone)s that can be used include polyethersulfone (also known as "PES" or "PESU"), which contains at least 85 weight percent of units of formula (14a)

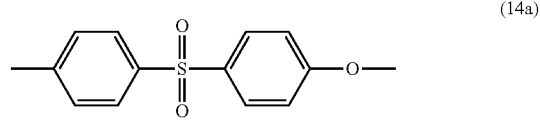
(14a)

or polyphenylene sulfone (also known as "PPSU" or polyphenylsulfone), which contains at least 85 weight percent of units of formula (14b)

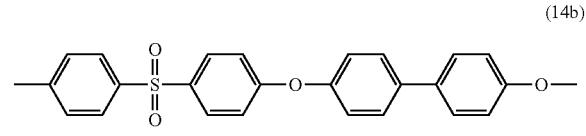
(14b)

or polyetherethersulfone, which contains at least 85 weight percent of units of formula (14c)

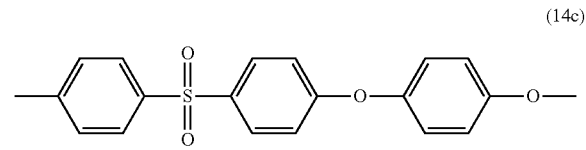
(14c)

or polysulfone (often referred to as "PSU"), which contains at least 85 weight percent of units of formula (14d)

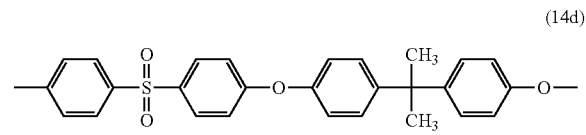
(14d)

or a combination comprising at least one of the foregoing poly(arylene ether sulfone)s. Copolymers comprising a combination of at least two types of units of formulas (1a), (1b), (1c), (1d), and (1e) can also be used.

The poly(arylene ether sulfone)s can be linear or branched, having 1 or more, 2 or more, or 5 or more branching points per 1,000 carbon atoms along the polymer chain. In an embodiment, the poly(arylene ether sulfone)s are linear, having 10 or fewer, 5 or fewer, 2 or fewer, or 1 or fewer branching points per 1,000 carbon atoms along the polymer chain. In an embodiment, the poly(arylene ether sulfone)s have a glass transition temperature (Tg) of greater than about 175° C., specifically from about 200° C. to about 280° C., and more specifically from about 255° C. to about 275° C. The poly(arylene ether sulfone)s can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

Exemplary poly(arylene ether sulfone)s that can be used include those that are available from sources such as Solvay Specialty Polymers, Quadrant EPP, Centroplast Centro, Duneon, GEHR Plastics, Westlake Plastics, and Gharda Chemicals. Commercial grades of poly(phenylsulfone)s include those with the trade names RADEL™, UDEL™, ULTRASON™, and GAFONE™. Poly(arylene ether sulfone)s are commercially available from Solvay Advanced Polymers K.K. under the trademark of VERADEL™, from BASF Corporation under the trademark of ULTRASON™, and from Sumitomo Chemical Co., Ltd. under the trademark of SUMIKAEXCEL™.

Polyphenylene sulfones comprise repeating units having both an ether linkage and an aryl sulfone linkage in the backbone of the polymer as shown in formula (16)

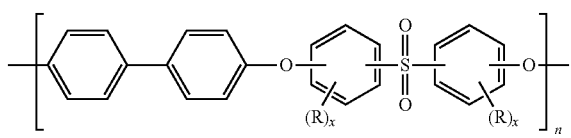

(16)

wherein R is hydrogen, alkyl, aryl, alkyl aryl, alkoxy, halogen or combinations thereof, each x equals 0 to 4, more specifically 0, and n equals 25 to 1000, or, more specifically, n equals 25 to 500, or, more specifically, n equals 25 to 100. The aryl sulfone linkages can be 4,4', 3,3', 3,4' or combinations thereof. In some embodiments the aryl sulfone linkages are 4,4' diaryl sulfone. In some embodiments greater than or equal to 50 mole percent of the main chain sulfone linkages are derived from biphenol.

An exemplary biphenol polyphenylene sulfone (PPSU) is shown in formula (17)

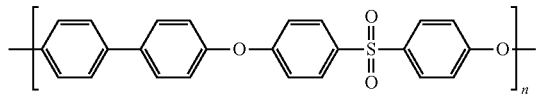

(17)

wherein n is as defined above.

In some embodiments, the polyphenylene sulfone is a polyphenylene sulfone copolymer of formula (18)

wherein A is a linking group selected from, —O—, —S—, —SO$_2$—, C$_6$-C$_{18}$ aryl, and C$_3$-C$_{12}$ alkyl. In some embodiments A is isopropylidene. Linkages of A to the aryl groups can be at the 4,4', 3,3', 3,4' positions or combinations thereof. In many embodiments the linkages are at the 4,4' positions. Aryl sulfone linkages can be at the 4,4', 3,3', 3,4' positions or combinations thereof. In many embodiments the linkages are at the 4,4' positions. R and x are defined as above; n>m, and n+m=20 to 1000, or, more specifically n+m=25 to 500, or, even more specifically, n+m=25 to 100. In some embodiments the polyphenylene sulfones have n equal to 70% and m equal to 30% based on the total of n+m. In some embodiments n equals 80% and m equals 20%, based on the total of n+m. In an embodiment, m=0 in polymer (10). When m=0, the polyphenylene sulfone is a homopolymer.

Exemplary aromatic dihydroxy compounds that can be used to make the polyphenylene sulfone copolymers include bisphenols and biphenols such as bisphenol A, dimethyl cyclohexyl bisphenol, dihydroxy diphenyl ether, hydroquinone, methyl hydroquinone and 4,4'-biphenol. Other exemplary aromatic dihydroxy compounds are disclosed in United States Patent Publication Nos. 2006/0167216, 2005/0113558, and 2006/0069236.

The polyphenylene sulfone can be a homopolymer, copolymer, or a combination thereof, or a combination of different polyphenylene sulfones. Copolymers include random copolymers, non-random copolymers and block copolymers.

An example of a polyphenylene sulfone copolymer is shown below in formula (19)

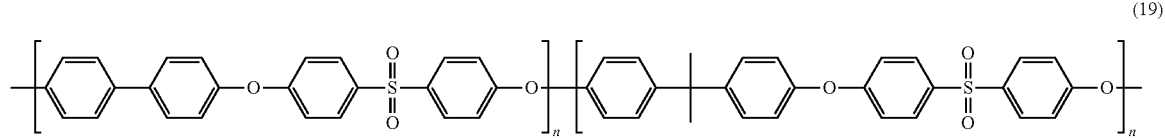

(19)

wherein n>m, n+m=25 to 100, A (from formula (10)) is isopropyl, all aryl linkages are at the 4,4' positions and R (from formula (10)) is hydrogen.

Polyphenylene sulfones are commercially available, including the polycondensation product of biphenol with dichloro diphenyl sulfone. Methods for the preparation of polyphenylene sulfones are widely known and several suitable processes have been well described in the art. Two methods, the carbonate method and the alkali metal hydroxide method, are known to the skilled artisan. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which a dihydric phenol and a dihalobenzenoid com-

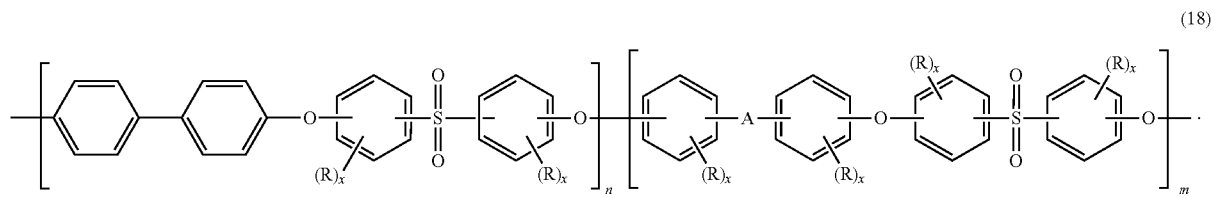

(18)

pound are heated, for example, with sodium carbonate or bicarbonate and a second alkali metal carbonate or bicarbonate is also disclosed in the art, for example in U.S. Pat. No. 4,176,222. Alternatively, the polyphenylene sulfone can be prepared by any of the variety of methods known in the art including those described in the United States Patent Publications referenced above.

The molecular weight of the polyphenylene sulfone, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The polyphenylene sulfone weight average molecular weight (Mw) can be 10,000 to 100,000 grams/mole as determined by gel permeation chromatography using ASTM D5296 with polystyrene standards. In some embodiments the polyphenylene sulfone weight average molecular weight can be 10,000 to 80,000 grams/mole. Polyphenylene sulfones can have glass transition temperatures (Tg) of 180 to 250° C.

In some embodiments the polyphenylene sulfone has less than 50 ppm hydroxyl groups, and the polyphenylene sulfone is methyl ether end-capped.

A polyamideimide (PAI) can be formed via an acid chloride route wherein condensation of an aromatic diamine, such as methylene dianiline (MDA), and an aromatic diacid chloride, such as trimellitic acid chloride (TMAC), terephthaloyl chloride, isophthaloyl chloride, or naphthoyl chloride, occurs. Reaction of the anhydride with the diamine produces an intermediate amic acid. The acid chloride functional group reacts with the aromatic amine to give the amide bond and hydrochloric acid (HQ) as a by-product. PAI can also be formed via a diisocyanate route wherein a diisocyanate, such as 4,4'-methylene diphenyl diisocyanate (MDI), is reacted with trimellitic anhydride (TMA).

Polyamide resins, also known as nylons, are characterized by the presence of an amide group (—C(O)NH—), and are described in U.S. Pat. No. 4,970,272. Exemplary polyamide resins include, but are not limited to, nylon-6; nylon-6,6; nylon-4; nylon-4,6; nylon-12; nylon-6,10; nylon-6,9; nylon-6,12; amorphous polyamides; polyphthalamides; nylon-6/6T and nylon-6,6/6T with triamine contents below 0.5 weight percent; nylon-9T and combinations comprising one or more of the foregoing polyamides. The composition may comprise two or more polyamides, for example the polyamide may comprises nylon-6 and nylon-6,6. In one embodiment the polyamide resin or combination of polyamide resins has a melting point (Tm) greater than or equal to 171° C. When the polyamide comprises a super tough polyamide, i.e. a rubber-toughed polyamide, the composition may or may not contain a separate impact modifier.

Polyamide resins may be obtained by a number of well known processes such as those described in U.S. Pat. Nos. 2,071,250; 2,071,251; 2,130,523; 2,130,948; 2,241,322; 2,312,966; 2,512,606; and 6,887,930. Polyamide resins are commercially available from a wide variety of sources.

Polyamide resins having an intrinsic viscosity of up to 400 milliliters per gram (ml/g) can be used, or, more specifically, having a viscosity of 90 to 350 ml/g, or, even more specifically, having a viscosity of 110 to 240 ml/g, as measured in a 0.5 weight percent solution in 96 weight percent sulfuric acid in accordance with ISO 307.

The polyamide may have a relative viscosity of up to 6, or, more specifically, a relative viscosity of 1.89 to 5.43, or, even more specifically, a relative viscosity of 2.16 to 3.93.

Relative viscosity is determined according to DIN 53727 in a 1 weight percent solution in 96 weight percent sulfuric acid.

In one embodiment, the polyamide resin comprises a polyamide having an amine end group concentration greater than or equal to 35 microequivalents amine end group per gram of polyamide (µeq/g) as determined by titration with HCl. Within this range, the amine end group concentration may be greater than or equal to 40 µeq/g, or, more specifically, greater than or equal to 45 µeq/g. The maximum amount of amine end groups is typically determined by the polymerization conditions and molecular weight of the polyamide. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HC used for the blank, the molarity of the HCl solution and the weight of the polyamide sample.

The composition comprises polyamide in an amount sufficient to form a continuous phase or co-continuous phase of the composition. The amount of polyamide can be 30 to 85 weight percent. Within this range, the polyamide may be present in an amount greater than or equal to 33 weight percent, or, more specifically, in an amount greater than or equal to 38 weight percent, or, even more specifically, in an amount greater than or equal to 40 weight percent. Also within this range, the polyamide may be present in an amount less than or equal to 60 weight percent, or, more specifically, less than or equal to 55 weight percent, or, even more specifically, less than or equal to 50 weight percent. Weight percent is based on the total weight of composition.

Polyarylates are aromatic polyesters that can be derived from aromatic dicarboxylic acids and bisphenols. Aromatic dicarboxylic acid dichlorides can be used.

Aromatic dicarboxylic acids that can be used to prepare polyarylates include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination thereof. Aromatic dicarboxylic acid dichlorides that can be used to prepare polyacrylates include isophthaloyl dichloride, terephthaloyl dichloride, diphenyl dicarboxylic acid dichloride, diphenylether dicarboxylic acid dichloride, diphenylsulfone dicarboxylic acid dichloride, diphenylketone dicarboxylic acid dichloride, diphenylsulfide dicarboxylic acid dichloride, and naphthalene-2,6-dicarboxylic acid dichloride.

Bisphenols include those of the formula (2) or formula (3). Examples of the bisphenols include bisphenol A and resorcinol.

The solvent can generally be any organic solvent provided that the polymer is not soluble in the solvent at the first temperature, but soluble at the second temperature under the conditions as described in further detail below. In some embodiments, it is possible to determine solubility at ambient temperature, such that in some embodiments, the polymer has a solubility of less than 2,000 milligrams per 100 milliliters, preferably less than 1000 milligrams per 100 milliliters of the solvent at 23° C. The solvent can be ortho-cresol, meta-cresol, para-cresol, chlorobenzene, bromobenzene, anisole, veratrole, dichlorotoluene, dichlorobenzene, 1,2,4-trichlorobenzene, xylene, toluene, benzene, ethylbenzene, propylbenzene, mesitylene, N-methylpyrrolidinone, N-ethylpyrrolidone, N-cylcohexyl 2-pyrrolidone, dimethylacetamide, dimethylformamide, diphenyl sulfone, diphenyl ether, phenetole, dimethyl sulfoxide, sulfolane, dimethylsulfolane, methylene chloride, ethylene tetrachloride, trichloromethane, methanol, ethanol, cyclopentanone, cyclohexanone, tetrahydrofuran, methyl ethyl ketone, acetone, a $C_{1-6}$ alcohol, methyl isobutyl ketone, ethyl acetate, water, or a combination comprising at least one of the foregoing. In some embodiments, the solvent comprises xylene, methyl ethyl ketone, ortho dichloro benzene or N-methylpyrrolidinone.

In some embodiments, in addition to the polymer and the solvent, the slurry can optionally further comprise a surfactant. The surfactant can be a nonionic surfactant, an anionic surfactant, or a combination comprising at least one of the foregoing. Exemplary nonionic surfactants can include an aliphatic alcohol ethoxylate having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 mol of ethylene oxide. Examples of commercially available nonionic surfactants of this type are TERGITOL™ 15-S-9 (a condensation product of $C_{11-15}$ linear secondary alcohol with 9 moles ethylene oxide), TERGITOL™ 24-L-NMW (a condensation product of $C_{12-14}$ linear primary alcohol with 6 moles of ethylene oxide) with a narrow molecular weight distribution from Dow Chemical Company. This class of product also includes the GENAPOL™ brands of Clariant GmbH.

Other nonionic surfactants that can be used include polyethylene, polypropylene, and polybutylene oxide condensates of $C_{6-12}$ alkyl phenols, for example compounds having 4 to 25 moles of ethylene oxide per mole of $C_{6-12}$ alkylphenol, preferably 5 to 18 moles of ethylene oxide per mole of $C_{6-12}$ alkylphenol. Commercially available surfactants of this type include IGEPAL™ CO-630, TRITON™ X-45, X-114, X-100 and X-102, TERGITOL™ TMN-10, TERGITOL™ TMN-100X, and TERGITOL™ TMN-6 (all polyethoxylated 2,6,8-trimethyl-nonylphenols or mixtures thereof) from Dow Chemical Corporation, and the ARKOPAL™ N products from Hoechst AG.

Still others include the addition products of ethylene oxide with a hydrophobic base formed by the condensation of propylene oxide with propylene glycol. The hydrophobic portion of these compounds preferably has a molecular weight between about 1,500 and about 1,800 grams/mole. Commercially available examples of this class of product are the PLURONIC™ surfactants from BASF and the GENAPOL™ PF surfactants of Hoechst AG.

The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2,500 to about 3,000 grams/mole. This hydrophobic moiety of ethylene oxide is added until the product contains from about 40 to about 80 weight percent of polyoxyethylene and has a molecular weight of about 5000 to about 11,000 grams/mole. Commercially available examples of this compound class are the TETRONIC™ surfactants from BASF and the GENAPOL™ PN surfactants of Hoechst AG.

In some embodiments, the nonionic surfactant is a $C_{6-12}$ alkyl phenol having 4 to 25 moles of ethylene oxide per mole of $C_{6-12}$ alkylphenol, preferably 5 to 18 moles of ethylene oxide per mole of $C^{6-12}$ alkylphenol.

Exemplary anionic surfactants can include ammonium lauryl sulfate, sodium lauryl ether sulfate (SLES), sodium myreth sulfate, dioctyl sodium sulfosuccinate, perfluorooctane sulfonate (PFOS), perfluorobutane sulfonate, linear alkyl benzene sulfonates, sodium dodecyl benzene sulfonate, sodium lauryl sulfate, or a combination comprising at least one of the foregoing.

Combinations of any of the foregoing surfactants can be included in the slurry.

When present, a surfactant can be included in the slurry in an amount of 0.1 to 10 weight percent, based on the total weight of the slurry. In some embodiments, no surfactants are added to the slurry.

In some embodiments, the slurry can optionally further comprise an additive for polymer slurries and particles known in the art, with the proviso that the additive(s) are selected so as to not significantly adversely affect the desired properties of the slurry, the homogeneous solution, or the resulting polymer particles. Such additives include a particulate filler (such as glass, carbon, mineral, or metal), antioxidant, beat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a FIFE-encapsulated styrene-acrylonitrile copolymer (TSAN)), or a combination comprising one or more of the foregoing. Additives can also include aqueous polymer dispersions or emulsions comprising polymers that are different from the polymer discussed above. Examples include poly(tetrafluoroethylene) (PTFE) emulsions, (meth)acrylic emulsions, and the like. In some embodiments, the slurry can include a nanometer- or micrometer-sized organic or inorganic filler. Exemplary fillers can include titania, talc, clay, silica, and the like, or combinations comprising at least one of the foregoing. Without wishing to be bound by theory, it is believed that addition of such fillers to the slurry can aid in crystallization of the polymer during cooling by acting as a seed. Thus, the resulting polymer particles can also include the additives that are added to the slurry prior to formation of the polymer particles. In general, the additives are used in the amounts generally known to be effective. For example, the total amount of the additive composition (other than any filler) can be 0.001 to 10.0 weight percent, or 0.01 to 5 weight percent, each based on the total weight of the polymer dispersion. When used as a nucleating agent, the filler can also be present as part of the additive composition in the foregoing amounts.

The method further comprises heating the polymer slurry to a second temperature for a time and at a pressure effective to dissolve the polymer in the solvent to provide a homogeneous solution. The second temperature, time of heating, and pressure during heating can be adjusted to effect dissolution. For example, a lower temperature can be effective when the pressure is increased, or a higher temperature can be effective at a lower pressure. The precise conditions can be determined by one of ordinary skill in the art without undue experimentation using the guidelines described herein.

The second temperature can be at least 2° C. greater than the boiling point of the solvent, preferably at least 5° C. greater than the boiling point of the solvent, more preferably at least 10° C. greater than the boiling point of the solvent, for example, the second temperature can be 2° C. to 150° C.

greater than the boiling point of the solvent, or 5° C. to 150° C. greater than the boiling point of the solvent, or 5° C. to 120° C. greater than the boiling point of the solvent, or 10° C. to 150° C. greater than the boiling point of the solvent, or 10° C. to 100° C. greater than the boiling point of the solvent. The second temperature can be less than 100° C. greater than the boiling point of the solvent, preferably less than 50° C. greater than the boiling point of the solvent, more preferably less than 25° C. greater than the dissolution temperature. For example, the second temperature can less than or equal to 450° C. The (absolute) pressure is 7 to 2068 kilopascals. Within this range, the pressure can be 107 to 2068 kilopascals, or 107 to 1750 kilopascals, or 114 to 2068 kilopascals.

Heating outside of the disclosed temperature range can lead to incomplete dissolution, or very lengthy processing times. In some embodiments, the slurry can be heated continuously until the second temperature is reached. In some embodiments, the slurry can be heated step-wise with one, two, three or more intermediate stops at preselected temperatures which are greater than the first temperature, but less than the second temperature.

The time the slurry is heated at the second temperature can vary widely depending on the temperature and pressure used. It is generally desirable to heat for as short a time as possible for efficiency and to decrease formation of any side products. For example, the total time of heating can be 5 seconds to 8 minutes, or 10 seconds to 5 minutes, or 30 seconds to 3 minutes. In some embodiments, when step-wise heating is used, the slurry can be maintained at the intermediate temperature(s) for 10 to 60 seconds, preferably 10 to 30 seconds. In some embodiments, when the second temperature is reached, the slurry or solution can be maintained at the second temperature for 10 to 60 seconds, for example 20 to 40 seconds.

The pressure can be adjusted to effect dissolution, and can be selected based on the second temperature. For example, higher pressure can allow for the use of lower temperature, or a lower pressure can necessitate use of higher temperature. In some embodiments, the pressure is less than 1825 kilopascals, or less than 1135 kilopascals, or less than 791 kilopascals. Within these ranges, the pressure can be greater than or equal to 7 kilopascals, or greater than or equal to 107 kilopascals, or greater than or equal to 136 kilopascals. In some embodiments, the pressure is of 136 to 791 kilopascals.

The method further comprises cooling the homogeneous solution to a third temperature to provide particles of the desired size and distribution. In some embodiments, the cooling can be conducted at a desired pressure and using a particular cooling rate effective to provide the desired polymer particles. The third temperature, pressure, and cooling rate depends on the particular polymer and solvent selected, and can be determined without undue experimentation using the guidance provided herein. For example, the third temperature can be less than or equal to 100° C., preferably 25 to 100° C., more preferably 25 to 75° C., even more preferably 40 to 60° C. In some embodiments, cooling the homogeneous solution can be at a pressure of 0 to 100 psig (0 to 0.69 MPa). In some embodiments, cooling the homogeneous solution is at a constant cooling rate of greater than or equal to 1° C./second, preferably 1 to 3° C./second, more preferably 2 to 2.5° C./second. In some embodiments, cooling the homogeneous solution is by a stepwise cooling process. For example, in some embodiments, the solution can be cooled stepwise with one, two, three or more intermediate stops at preselected temperatures which are greater than the third temperature, but less than the second temperature. Cooling to the one or more intermediate temperatures can be at a rate of 0.1 to 1° C./second, or 0.2 to 1° C./second. Furthermore, when a stepwise cooling process is used, the process can include a dwell time of 1 to 10 minutes at each intermediate temperature. In some embodiments, cooling the homogeneous solution is preferably at a constant cooling rate of greater than or equal to 1° C./second, preferably 1 to 3° C./second, more preferably 2 to 2.5° C./second.

Cooling the homogeneous solution provides a dispersion comprising a plurality of polymer particles. The resulting polymer particles can have a Dv50 particle size of less than or equal to 125 micrometers, preferably less than or equal to 75 micrometers, more preferably less than or equal to 50 micrometers, and even more preferably less than or equal to 25 micrometers. The term "Dv50" as used herein means that 50% of the particles have a diameter that is equal to or less than the recited diameter. "Dv50" particle size is a volume-based particle size diameter. Specifically, Dv50 is the median equivalent spherical diameter of a volume based distribution of equivalent spherical diameters determined by laser diffraction according to ISO 13320:2020.

In some embodiments, the polymer particles are substantially spherical in morphology. For example, the polymer particles can be substantially spherical such that the particles have a sphericity of more than 0.7, preferably more than 0.8, more preferably more than 0.9, even more preferably more than 0.95. For example, the sphericity can be 0.7 to 1.0, or 0.8 to 1.0, or 0.9 to 1.0, or 0.95 to 1.0. The sphericity is defined by $((6\,V_p)/(D_p-A_p))$, where $V_p$ is the volume of the particle, $D_p$ is the diameter of the particle, and $A_p$ is the surface area of the particle. The sphericity of the polymer particles can be determined, for example, using scanning electron microscopy (SEM) or optical microscopy imaging techniques. Sphericity can be determined according to ISO 9276-6:2008.

In some embodiments, the polymer particles are irregularly shaped (i.e., are not spherical, as described above). An irregular, non-spherical particle can have a shape that is, for example, oblong, ellipsoid, elongated, tubular, prolate, cylindrical, toroidal, distorted, bent, or any other non-spherical shape. In some embodiments, the irregularly shaped particle can have uneven or jagged surfaces.

In some embodiments, the polymer particles comprise semicrystalline polymer. For example, the polymer particles can exhibit both a glass transition temperature (Tg) and a melting temperature (Tm), as measured, for example, using differential scanning calorimetry (DSC).

The polymer particles can subsequently be isolated from the dispersion. Isolating the polymer particles can be by any isolation technique for polymer particles that is generally known, for example, by filtration. In some embodiments, the method further comprises washing the isolated polymer particles. The isolated polymer particles can be washing with, for example, an organic solvent or a non-solvent such as acetone. In some embodiments, the organic solvent is preferably a $C_{1-6}$ alcohol (e.g., methanol, ethanol, propanol, isopropanol, butanol, and the like, or a combination comprising at least one of the foregoing, preferably methanol). In some embodiments, the method can further comprise drying the polymer particles, for example under heat, vacuum, or both. The precise conditions can be determined by one of ordinary skill in the art without undue experimentation. In some embodiments, the particles can be dried at a pressure of less than or equal to 95 kilopascals, or less than or equal to 70 kilopascals, or less than or equal to 15 kilopascals, or less than or equal to 2 kilopascals, or less than or equal to 0.5 kilopascals. In some embodiments, the particles can be dried at a temperature of greater than or equal to 100° C., or greater than or equal to 150° C. For example, the polymer particles can be dried at a temperature of greater than or equal to 100° C., and at atmospheric pressure.

Another aspect of the present disclosure is a polymer powder prepared according to the above-described method. The polymer powder comprises a plurality of polymer particles. The polymer can be as described above. The polymer particles have a Dv50 particle size of less than or equal to 125 micrometers, preferably less than or equal to 75 micrometers, more preferably less than or equal to 50 micrometers, and even more preferably less than or equal to 25 micrometers. In some embodiments, the polymer particles have a Dv50 of 5 to 125 micrometers, or 5 to 100 micrometers, or 5 to 75 micrometers, or 5 to 50 micrometers, or 5 to 25 micrometers. The particles can be substantially spherical in morphology, or can be irregularly shaped. The morphology of the particles can be determined by the particular conditions of the method used to obtain the powder, as described herein and as further described in the working examples below. The particles can also be semi-crystalline.

Accordingly, the method described herein advantageously provides polymer powders by heating the polymer to a temperature effective to dissolve the polymer, and subsequently cooling the solution to precipitate the desired polymer particles. The morphology and size distribution of the resulting polymer particles can be controlled through the solids content of the solution, the cooling rate used, and the optional addition of a surfactant, as described herein.

This disclosure is further illustrated by the following examples, which are non-limiting.

EXAMPLES

The following examples were carried out using the materials detailed in Table 1.

The particle size distribution of isolated polymer particles was measured in water using laser diffraction (Mastersizer 3000 from Malvern). The dry polymer powder was made into a slurry with deionized (DI) water containing surfactant and sonicated for five minutes. The slurry was added to the Malvern reservoir, which contains DI water. The volume-based particle size distribution was measured. The obtained Dv100 value indicates that 100% of the particles (based on volume) are less than the stated diameter, the obtained Dv90 value indicates that 90% of the particles (based on volume) are less than the stated diameter, the obtained Dv50 value indicates that 50% of the particles (based on volume) are less than the stated diameter, and the obtained Dv10 value indicates that 10% of the particles (based on volume) are less than the stated diameter.

Preparation of Polycarbonate and Polycarbonate Copolymer Powder Particles Via Heating-Cooling A total of 50 grams (g) of PC-1 was placed into a small jar, along with 150 g of Xyl, to provide a 25 weight percent (wt. %) solids solution. Both the solvent as well as the powder were poured into a PARR™ pressure reactor system. The temperature was set to 150° C. and the agitator to 100 revolutions per minute (rpm). Once temperature was reached, the agitation was allowed to proceed for 20 minutes, while the pressure was maintained at 22 pounds per square inch (152 kilopascals).

After 20 minutes, the entire system was allowed to cool to room temperature and the wet cake was filtered and washed with 50 grams of MeOH. The powder was then placed in a vacuum oven at 145° C. overnight to remove residual solvent, which reduced particle size. Particle size distribution analysis was performed on a sample of the powder.

PC-2 and PC-Si were also tested using the above method. The slurry formed was filtered and washed with MeOH.

TABLE 1

| Material | Description | Source |
|---|---|---|
| PC-1 | High flow bisphenol A homopolycarbonate having a melt flow of 25 g/10 minutes per ASTM D 1238 at 300° C. and 1.2 kgf, Mw = 22,000 measured by Gel Permeation Chromatography (GPC) with bisphenol A homopolycarbonate as internal standard (trade name LEXAN HF1110 grade) | SABIC |
| PC-2 | High molecular weight bisphenol A homopolycarbonate, Mw = 30,000 measured by GPC with bisphenol A homopolycarbonate as internal standard (trade name LEXAN PC100) | SABIC |
| PC-Si | Dimethyl-siloxane-bisphenol A polycarbonate copolymer, transparent, melt flow of 10 grams/10 minutes per ASTM D1238 at 300° C. and 1.2 kilograms (trade name LEXAN EXL1463T) | SABIC |
| PPE | Poly(2,6-dimethyl-1,4-phenylene ether), intrinsic viscosity = 0.4 g/cm$^3$ | SABIC |
| PPSU | Amorphous polyphenylsulfone, CAS Reg. No. 25608-64-4, having a weight average molecular weight of 50,100 grams/mole and a number average molecular weight of 18,500 grams/mole, determined by gel permeation chromatography using polystyrene standard; having a hydroxyl group content less than 10 parts per million by weight; obtained in pellet form as RADEL ™ R5100-5 | Solvay |
| PPS | Polyphenylene sulfide (trade name Fortran grade 0214B) | Celanese Corporation |
| Xyl | Xylenes, boiling point of 139° C. | Fisher Scientific |
| MEK | Methyl ethyl ketone, boiling point of 80° C. | Fisher Scientific |
| NMP | N-Methylpyrrolidone, boiling point of 202° C. | Fisher Scientific |
| MeOH | Methanol | Fisher Scientific |
| ODCB | ortho-Dichlorobenzene, boiling point of 180° C. | Fisher Scientific |

The particle size results are shown in Table 2. Dv50, Dv90, and Dv100 were determined in volume analysis mode. "Span" is calculated as follows Span=(Dv90−Dv10)/Dv50

TABLE 2

| Polymer | Solids (weight %) | Dv10 (μm) | Dv50 (μm) | Dv90 (μm) | Dv100 (μm) | Span (μm) |
|---|---|---|---|---|---|---|
| PC-1 | 25% | 2.83 | 13.1 | 33.2 | 973 | 2.314 |
| PC-2 | 25% | 21.8 | 89.2 | 217 | 440 | 2.187 |
| PC-Si | 25% | 19.4 | 113 | 288 | 515 | 2.391 |
| PC-Si | 10% | 42.9 | 75.2 | 124 | 186 | 1.079 |

It can be seen from the data in Table 2 that when molecular weight of the homopolycarbonate increases, the mean particle size (Dv50) of the powder also increases (compare PC-1 with PC-2, which has the highest molecular weight). Depending on the powder particle size needs, the appropriate polycarbonate can be selected. It can be further seen from the data in the last two rows of Table 2 that when the polymer concentration (solids, weight %) decreases, the mean particle size (Dv50) decreases, which is also associated with a lower span value.

The PC-Si powder after drying was evaluated for thermal properties via Differential Scanning Calorimetry (with a rate of 20° C./minute). The PC-Si powder after drying had a melting point (Tm) of about 224.8° C. with an exotherm of 21.9 joules per gram (J/g) in the first cycle. In the second cycle, there was no melting point (Tm). The second cycle only exhibited a glass transition temperature (Tg) of about 148.55° C., which indicates that the powder formed from the heating and cooling process is semi-crystalline and upon melting the powder becomes amorphous.

Preparation of Polyphenylene Ether Powder Particles Via Heating-Cooling 20 g of PPE was placed into a small jar, along with 180 g of MEK, providing a 10 wt. % solids solution. Both the solvent as well as the powder were poured into a PARR™ pressure reactor system. The temperature was set to 140° C. and the agitator to 62 rpm. Once temperature was reached, the reaction was allowed to proceed for 30 minutes, while the pressure was steady at 60 psi (414 kilopascals).

After 30 minutes, the entire system was allowed to cool and the wet cake was filtered and washed with 20 grams of MeOH The powder was then placed in a vacuum oven at 120° C. overnight to remove residual solvent. Particle size distribution in volume analysis mode was performed on a sample of the powder and the results are shown in Table 3.

TABLE 3

| Sample | Dv10 (μm) | Dv50 (μm) | Dv90 (μm) | Dv100 (μm) | Span (μm) |
|---|---|---|---|---|---|
| PPE | 0.16 | 15.4 | 70.3 | 116 | 4.551 |

The PPE powder after drying was evaluated for thermal properties via Differential Scanning Calorimetry (with a rate of 20° C./minute). The PPE powder after drying had a melting point (Tm) of about 252.2° C. with an exotherm of 16.9 J/g in the first cycle. In the second cycle, there was no melting point (Tm). The second cycle only exhibited a glass transition temperature (Tg) of about 217.7° C., which indicates that the powder formed from the heating and cooling process is semi-crystalline and upon melting the powder becomes amorphous. A scanning electron microscope (SEM) micrograph of the PPE powder after drying can be seen in the FIGURE.

Preparation of Polyphenylene Sulfone Powder Particles Via Heating-Cooling 5 grams of PPSU pellets were placed into a PARR™ pressure reactor system, along with 45 grams of ODCB, providing a 10 wt. % solids solution. The temperature was set to 240° C. and the agitator to 62 rpm. Once temperature was reached, the reaction was allowed to proceed for 30 minutes, while the pressure was maintained at less than 75 psig (517 kilopascals).

After 30 minutes, the entire system was allowed to cool and the wet cake was filtered and washed with 20 grams of MeOH. The powder was then placed in a vacuum oven at 200° C. overnight to remove residual solvent. Particle size distribution analysis in volume analysis mode was performed on a sample of the powder and the results are shown in Table 5.

TABLE 5

| Sample | Dv10 (μm) | Dv50 (μm) | Dv90 (μm) | Dv100 (μm) | Span (μm) |
|---|---|---|---|---|---|
| PPSU | 21.5 | 85.2 | 285 | 526 | 3.087 |

The PPSU powder after drying was evaluated for thermal properties via Differential Scanning Calorimetry (with a rate of 20° C./minute). The PPSU powder after drying had a melting point (Tm) of about 263.2° C. with an exotherm of 23.4 J/g in the first cycle. In the second cycle, there was no melting point (Tm). The second cycle only exhibited a glass transition temperature (Tg) of about 225.2° C., which indicates that the powder formed from the heating and cooling process is semi-crystalline and upon melting the powder becomes amorphous.

This disclosure further encompasses the following aspects.

Aspect 1. A method of preparing polymer particles, the method comprising combining a polymer and a solvent at a first temperature to provide a slurry, wherein the polymer is not soluble in the solvent at the first temperature, and wherein (a) the polymer is a polycarbonate and the solvent is selected from the group consisting of xylene, toluene, ethyl acetate, para-cymene, mesitylene, cyclohexane, ethylbenzene, ethyl lactate, 2-ethoxyethanol, 2-butoxyethanol, and combinations thereof, or (b) the polymer is a poly(arylene ether) and the solvent is selected from the group consisting of acetone, methyl ethyl ketone, methyl n-butyl ketone, methyl iso-butyl ketone, di(iso-butyl) ketone, diacetone alcohol, cyclopentanone, cyclohexanone, anisole, and combinations thereof, or (c) the polymer is a poly(arylene ether sulfone) and the solvent is selected from the group consisting of chlorobenzene, ortho-dichlorobenzene, xylenes, toluene, para-cymene, mesitylene, cyclohexane, ethyl benzene, ethyl lactate, 2-ethoxyethanol, 2-butoxyethanol, cyclohexanone, cyclopentanone, anisole, and combinations thereof; heating the slurry to a second temperature and at a pressure effective to dissolve the polymer in the solvent to provide a homogeneous solution, wherein the pressure is 7 to 2068 kilopascals; cooling the homogeneous solution to a third temperature to provide a dispersion comprising a plurality of polymer particles; and isolating the polymer particles from the dispersion; wherein the isolated polymer particles have a Dv50 particle size of less than or equal to 125 micrometers, determined by laser diffraction according to ISO 13320:2020.

Aspect 2. The method of Aspect 1, wherein the polymer is the polycarbonate and the solvent is selected from the group consisting of xylene, toluene, ethyl acetate, para-cymene, mesitylene, cyclohexane, ethylbenzene, ethyl lactate, 2-ethoxyethanol, 2-butoxyethanol, and combinations thereof.

Aspect 3. The method of Aspect 1, wherein the polymer is the poly(arylene ether) and the solvent is selected from the group consisting of acetone, methyl ethyl ketone, methyl n-butyl ketone, methyl iso-butyl ketone, di(iso-butyl) ketone, diacetone alcohol, cyclopentanone, cyclohexanone, anisole, and combinations thereof.

Aspect 4. The method of Aspect 1, wherein the polymer is the poly(arylene ether sulfone) and the solvent is selected from the group consisting of chlorobenzene, ortho-dichlorobenzene, xylenes, toluene, para-cymene, mesitylene, cyclohexane, ethyl benzene, ethyl lactate, 2-ethoxyethanol, 2-butoxyethanol, cyclohexanone, cyclopentanone, anisole, and combinations thereof.

Aspect 5. The method of any one of Aspects 1 to 4, wherein the first temperature is less than or equal to 100° C., or 10 to 100° C., or 15 to 50° C.; the second temperature is at least 2° C. greater than the boiling point of the solvent, or at least 5° C. greater than the boiling point of the solvent, or at least 10° C. greater than the boiling point of the solvent; the third temperature is less than or equal to 100° C., or 10 to 100° C., or 15 to 50° C.; or a combination comprising at least two of the foregoing.

Aspect 6. The method of Aspect 1 or 5, wherein the polymer is the polycarbonate and the solvent is selected from the group consisting of xylene, toluene, ethyl acetate, and combinations thereof.

Aspect 7. The method of Aspect 1 or 5, wherein the polymer is the poly(arylene ether) and the solvent is selected from the group consisting of acetone, methyl ethyl ketone, methyl n-butyl ketone, methyl iso-butyl ketone, di(iso-butyl) ketone, diacetone alcohol (4-hydroxy-4-methylpentan-2-one), and combinations thereof.

Aspect 8. The method of Aspect 1 or 5, wherein the polymer is the poly(arylene ether sulfone) and the solvent is selected from the group consisting of chlorobenzene, ortho-dichlorobenzene, and combinations thereof.

Aspect 9. The method of any one of Aspects 1 to 8, wherein the slurry has a solids content of 1 to 50 weight percent, or 2 to 40 weight percent, or 5 to 30 weight percent, or 6 to 20 weight percent, or 7 to 10 weight percent, based on a total weight of the slurry.

Aspect 10. The method of any one of Aspects 1 to 9, wherein isolating the polymer powder comprises filtration.

Aspect 11. The method of any one of Aspects 1 to 10, wherein the polymer is amorphous when it is combined with the solvent, and the isolated polymer particles comprise semi-crystalline polymer.

Aspect 12. The method of Aspect 1, wherein (a) the polymer is the polycarbonate and the solvent is selected from the group consisting of toluene, xylenes, and combinations thereof, or (b) the polymer is the poly(arylene ether) and the solvent is selected from the group consisting of methyl ethyl ketone, methyl isobutyl ketone, and combinations thereof, or (c) the polymer is the poly(arylene ether sulfone) and the solvent is selected from the group consisting of chlorobenzene, ortho-dichlorobenzene, and combinations thereof; wherein the first temperature is 15 to 50° C.; wherein the polymer is present in the slurry at a concentration of 5 to 30 weight percent, based on a total weight of the slurry; wherein the second temperature is at least 2° C. greater than the boiling point of the solvent, or at least 5° C. greater than the boiling point of the solvent, or at least 10° C. greater than the boiling point of the solvent; wherein the pressure is 107 to 1750 kilopascals; wherein the third temperature is 15 to 50° C.; wherein the isolating the polymer particles comprises filtration of the polymer particles; and wherein the isolated polymer particles have a Dv50 particle size of 5 to 125 micrometers.

Aspect 13. The method of aspect 1, comprising combining a polymer comprising a polycarbonate, a polyphenylene ether, a polyphenylene sulfide, or a polyaryl ether ketone; and a solvent, wherein the polymer is the polycarbonate and the solvent comprises xylene or toluene, the polymer is the polyphenylene ether and the solvent comprises methyl ethyl ketone or methyl isobutyl ketone, the polymer is the polyphenylene sulfide and the solvent comprises N-methylpyrrolidinone, or the polymer is polyphenylene sulfone and the solvent comprises dichlorobenzene, at a first temperature of 15 to 50° C. to provide a slurry, wherein the polymer is not soluble in the solvent at the first temperature, and the polymer is present in the slurry at a concentration of 5 to 30 weight percent, based on a total weight of the slurry; heating the slurry to a second temperature at least 2° C. greater than the boiling point of the solvent, preferably at least 5° C. greater than the boiling point of the solvent, more preferably at least 10° C. greater than the boiling point of the solvent, and a pressure of greater than 13.7 kilopascals to provide a homogeneous solution comprising dissolved polymer and the solvent; cooling the homogeneous solution to a third temperature of 15 to 50° C. and a pressure of 0 to 689 kilopascals, preferably 0 to 345 kilopascals, to provide a dispersion comprising a plurality of polymer particles; and isolating the polymer particles by filtration; wherein the polymer particles have a Dv50 particle size of less than or equal to 125 micrometers.

Aspect 14. A polymer powder prepared by the method of any one or more of aspects 1 to 13.

Aspect 15. The polymer powder of aspect 14, wherein the polymer powder is semi-crystalline.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. The term "a combination thereof" in reference to a list of alternatives is open, i.e., includes at least one of the listed alternatives, optionally with a like alternative nots listed. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or can be presently unforeseen can arise to applicants or others skilled in the art. Accordingly, the appended claims as filed and as they may be amended are intended to embrace all such alternatives, modifications variations, improvements, and substantial equivalents.

The invention claimed is:

1. A method of preparing polymer particles, the method comprising
combining a polymer and a solvent at a first temperature to provide a slurry, wherein the polymer is not soluble in the solvent at the first temperature, and wherein
the polymer is a poly(arylene ether) and the solvent is selected from the group consisting of acetone, methyl ethyl ketone, methyl n-butyl ketone, methyl iso-butyl ketone, di(iso-butyl) ketone, diacetone alcohol, cyclopentanone, cyclohexanone, anisole, and combinations thereof;
heating the slurry to a second temperature and at a pressure effective to dissolve the polymer in the solvent to provide a homogeneous solution, wherein the pressure is 7 to 2068 kilopascals;
cooling the homogeneous solution to a third temperature to provide a dispersion comprising a plurality of polymer particles; and
isolating the polymer particles from the dispersion;
wherein the isolated polymer particles have a Dv50 particle size of less than or equal to 125 micrometers, determined by laser diffraction according to ISO 13320:2020.

2. The method of claim 1, wherein the polymer is the poly(arylene ether) and the solvent is selected from the group consisting of acetone, methyl ethyl ketone, methyl n-butyl ketone, methyl iso-butyl ketone, di(iso-butyl) ketone, diacetone alcohol, cyclopentanone, cyclohexanone, anisole, and combinations thereof.

3. The method of claim 1, wherein
the first temperature is less than or equal to 100° C.;
the second temperature is at least 2° C. greater than the boiling point of the solvent;
the third temperature is less than or equal to 100° C.; or
a combination comprising at least two of the foregoing.

4. The method of claim 1, wherein the polymer is the poly(arylene ether) and the solvent is selected from the group consisting of acetone, methyl ethyl ketone, methyl n-butyl ketone, methyl iso-butyl ketone, di(iso-butyl) ketone, diacetone alcohol, and combinations thereof.

5. The method of claim 1, wherein the slurry has a solids content of 1 to 50 weight percent, based on a total weight of the slurry.

6. The method of claim 1, wherein isolating the polymer powder comprises filtration.

7. The method of claim 1, wherein the polymer is amorphous when it is combined with the solvent, and the isolated polymer particles comprise semi-crystalline polymer.

8. A method of preparing polymer particles, the method comprising
combining a polymer and a solvent at a first temperature to provide a slurry, wherein the polymer is not soluble in the solvent at the first temperature, wherein
the polymer is a poly(arylene ether) and the solvent is selected from the group consisting of methyl ethyl ketone, methyl isobutyl ketone, and combinations thereof,
wherein the first temperature is 15 to 50° C.; and wherein the polymer is present in the slurry at a concentration of 5 to 30 weight percent, based on a total weight of the slurry;
heating the slurry to a second temperature and at a pressure effective to dissolve the polymer in the solvent to provide a homogeneous solution, wherein the pressure is 107 to 1750 kilopascals; wherein the second temperature is at least 2° C. greater than the boiling point of the solvent, or at least 5° C. greater than the boiling point of the solvent, or at least 10° C. greater than the boiling point of the solvent;
cooling the homogeneous solution to a third temperature to provide a dispersion comprising a plurality of polymer particles; wherein the third temperature is 15 to 50° C.; and
isolating the polymer particles from the dispersion; wherein the isolating the polymer particles comprises filtration of the polymer particles; and
wherein the isolated polymer particles have a Dv50 particle size of 5 to 125 micrometers, determined by laser diffraction according to ISO 13320:2020.

9. Polymer particles prepared by the method of claim 1, wherein the polymer particles comprise semi-crystalline polymer.

* * * * *